US012258795B2

(12) United States Patent
Inan et al.

(10) Patent No.: US 12,258,795 B2
(45) Date of Patent: Mar. 25, 2025

(54) MOTOR VEHICLE LOCK

(71) Applicant: Kiekert AG, Heiligenhaus (DE)

(72) Inventors: Ömer Inan, Dorsten (DE); Michael Scholz, Essen (DE); Manuel Reusch, Düsseldorf (DE); Christian Bauer, Essen (DE)

(73) Assignee: Kiekert AG, Heiligenhaus (DE)

( * ) Notice: Subject to any disclaimer, the term of this patent is extended or adjusted under 35 U.S.C. 154(b) by 393 days.

(21) Appl. No.: 17/421,050

(22) PCT Filed: Jan. 10, 2020

(86) PCT No.: PCT/DE2020/100013

§ 371 (c)(1),
(2) Date: Jul. 7, 2021

(87) PCT Pub. No.: WO2020/143881

PCT Pub. Date: Jul. 16, 2020

(65) Prior Publication Data

US 2022/0056739 A1 Feb. 24, 2022

(30) Foreign Application Priority Data

Jan. 11, 2019 (DE) ..................... 10 2019 100 591.4

(51) Int. Cl.
*E05B 81/68* (2014.01)
*E05B 17/22* (2006.01)
(Continued)

(52) U.S. Cl.
CPC .............. *E05B 81/68* (2013.01); *E05B 17/22* (2013.01); *E05B 81/08* (2013.01); *E05B 2047/0069* (2013.01)

(58) Field of Classification Search
CPC .......... E05B 81/68; E05B 81/08; E05B 17/22; E05B 2047/0069
(Continued)

(56) References Cited

U.S. PATENT DOCUMENTS 7,242,187 B1 * 7/2007 Ku ......................... G01R 33/07 324/207.2
11,306,519 B2 * 4/2022 Ney ....................... H03K 17/97
(Continued)

FOREIGN PATENT DOCUMENTS

DE 19743129 A1 * 3/1999 ............. E05B 81/25
DE 10065100 A1 7/2002
(Continued)

OTHER PUBLICATIONS

Translation of International Search Report issued Mar. 23, 2020, for International Patent Application No. PCT/DE2020/100013.

*Primary Examiner* — Kristina R Fulton
*Assistant Examiner* — James Edward Ignaczewski
(74) *Attorney, Agent, or Firm* — Renner, Otto, Boisselle & Sklar, LLP

(57) ABSTRACT

A motor vehicle lock which is equipped with a locking mechanism consisting substantially of a catch and a pawl. Also provided is a sensor arrangement associated with the locking mechanism comprising a fixed sensor and a sensing element that influences signals of the sensor and follows the locking mechanism, or vice versa. The sensor generates at least two different signals associated with the presence and absence of the sensing element in the region of influence of the sensor. According to the invention, the single sensing element also produces at least one additional third signal of the single sensor in accordance with its position in relation to the sensor.

16 Claims, 5 Drawing Sheets

(51) Int. Cl.
*E05B 81/08* (2014.01)
*E05B 47/00* (2006.01)

(58) Field of Classification Search
USPC .......................................................... 292/216
See application file for complete search history.

(56) References Cited

U.S. PATENT DOCUMENTS

| | | | | |
|---|---|---|---|---|
| 2004/0130315 | A1* | 7/2004 | Lamb | E05B 81/70 324/207.2 |
| 2007/0126577 | A1* | 6/2007 | Cervantes | E05B 85/24 340/686.1 |
| 2016/0153212 | A1* | 6/2016 | Bingle | E05B 81/06 292/201 |

FOREIGN PATENT DOCUMENTS

| | | | | | |
|---|---|---|---|---|---|
| DE | 10239734 | A1 | | 3/2004 | |
| DE | 202006009262 | U1 | | 10/2007 | |
| DE | 202008004296 | U1 | * | 9/2009 | E05B 81/06 |
| DE | 102011119579 | A1 | | 5/2013 | |
| DE | 102016123328 | A1 | * | 6/2018 | |
| FR | 2768508 | A1 | * | 3/1999 | E05B 81/54 |
| JP | H03224980 | A | | 10/1991 | |

* cited by examiner

MOTOR VEHICLE LOCK

This application is a national phase of International Application No. PCT/DE2020/100013 filed Jan. 10, 2020, which claims priority to German Patent Application No. 10 2019 100 591.4 filed Jan. 11, 2019.

FIELD OF DISCLOSURE

The invention relates to a motor vehicle lock having a locking mechanism consisting substantially of a catch and pawl, and having a sensor arrangement associated with the locking mechanism comprising a fixed sensor and a movable sensing element that influences the signals of the sensor and follows the locking mechanism, or vice versa, the sensor generating at least two different signals associated with the presence and absence of the sensing element in the area of influence of the sensor.

BACKGROUND OF DISCLOSURE

The determination by a sensor, in particular of the main closed position of a motor vehicle lock, and, consequently, the detection of the main ratchet position of the associated locking mechanism are of particular importance in practice. This is because the associated motor vehicle door is reliably prevented from springing open, for example, in the event of an impact, and any safety measures such as side impact protection and side airbags can develop their full effect at the same time only in the main closed position or main ratchet position of the motor vehicle lock. In this way, not only are the occupants protected, but the motor vehicle doors can undergo an intended deformation together with the body in the event of such an impact. In addition, other safety-relevant components and the function thereof, such as side airbags, are often associated with the assumption of the main closed position or main ratchet position. The same generally applies to an alarm system.

In practice, it is particularly important to reliably detect what is known as a "sham lock." Such a sham lock corresponds to the fact that the associated motor vehicle door or motor vehicle flap is closed, although, for example, the pawl has been lifted as part of the locking mechanism. In the event of such a sham lock and a vibration of the motor vehicle door, the door can pop open.

For this reason, in the generic state of the art according to DE 100 65 100 A1, an influencing magnet is proposed as a sensing element in a motor vehicle lock. The influencing magnet or the sensing element interacts without contact with a sensor that can be influenced by the magnetic field of the influencing magnet. In this way, the main closed position of the catch or lock latch is recorded overall.

For this purpose, the influencing magnet is assigned to the lock latch and the pawl, and the sensor is arranged in such a way that the magnetic field of the influencing magnet influencing the sensor only reaches or exceeds an indicator field strength when the latch bolt is in the main closed position and the pawl has fallen into the lock latch. For this purpose, a portion made of magnetically highly conductive material is provided in or on the pawl, which portion overlaps the influencing magnet in the main closed position when the pawl has engaged.

In addition, another influencing magnet is provided in or on the pawl. In the main closed position of the lock latch and when the pawl has engaged, both influencing magnets are positioned in alignment with the sensor and influence the magnetic field acting on the sensor. The overall design is such that the indicator field strength is reached or exceeded only by both influencing magnets.

Such a construction is structurally complex and expensive due to the use of two influencing magnets or permanent magnets. In addition, problems with regard to functional reliability cannot be completely ruled out due to the combinatorial effect of both magnets.

The further state of the art according to DE 102 39 734 A1 concerns a motor vehicle flap lock that is equipped not only with a locking mechanism but also with an additional control drive. The control drive has a control member having an engagement element arranged thereon. By operating the control drive from an initial position, the pawl can be lifted out in a first direction with the aid of the control member. An opening assistance function is thereby realized. A closing assistance function is also possible.

In addition, two Hall sensors that are fixed relative to the pawl are provided. The pawl, for its part, has a magnet, as it were, as a sensing element. The two Hall sensors on the one hand and the magnet on the pawl on the other hand are arranged in such a way that the magnet can be moved into the detection region of one of the two Hall sensors or at the same time into the detection regions of both Hall sensors or outside the respective detection region of both Hall sensors by moving the pawl. In this way and by evaluating the sensor signals from the Hall sensors, the position of the pawl can be clearly determined.

As in the state of the art described above according to DE 100 65 100 A1, the further and likewise generic teaching according to DE 102 39 734 A1 also works with an overall complex construction. While DE 100 65 100 A1 uses two permanent magnets, DE 102 39 734 A1 uses two Hall sensors. This is similarly complex and in need of improvement with regard to increased functional reliability. The invention as a whole seeks to remedy this.

SUMMARY OF DISCLOSURE

The invention is based on the technical problem of further developing a motor vehicle lock of the construction described above in such a way that the functional reliability is increased while at the same time structurally simplifying the construction.

To solve this technical problem, the invention proposes, in a generic motor vehicle lock within the scope of the invention, that the single pushbutton element additionally produces at least one further third signal from the single sensor as a function of its position relative to the sensor.

In the context of the invention and in contrast to the state of the art according to DE 100 65 100 A1 as well as according to DE 102 39 734 A1, the invention does not rely on two sensors (or more) or on two sensing elements (or more). Rather, the invention is limited to a single sensing element that generates associated signals from a single sensor, specifically in accordance with the position of the sensing element relative to the sensor. Because the movable sensing element follows the locking mechanism, while the sensor is designed to be fixed, the at least three signals of the sensor to be distinguished from one another correspond to three different positions of the locking mechanism.

These three different positions of the locking mechanism to be detected according to the invention are, as a rule, a pre-ratchet position, a main ratchet position or an over-travel position of the locking mechanism. The over-travel position of the locking mechanism as usual involves the locking mechanism being pulled closed beyond the main ratchet position, for example with the aid of a closing drive, in order to ensure that the main ratchet position is safely fallen into after the closing drive is subsequently relieved. As an alternative or in addition to the over-travel position, an intermediate position of the locking mechanism can also be detected, namely a position during the transition from the pre-ratchet position to the main ratchet position. Of course, according to the invention, all four of the named positions can also be reliably detected with the aid of the single sensing element and the single sensor, namely the pre-ratchet position, the intermediate position, the main ratchet position and, finally, the over-travel position.

In order to realize this in detail, the movable sensing element is connected to the locking mechanism and can consequently follow the locking mechanism in the movements thereof and scan said movements. In contrast, the sensor is usually located in a fixed position on a housing. In fact, the sensor may be connected to a latch case, which is used to mount the locking mechanism made up of a catch and pawl.

In principle, this can also be done in reverse. In this case, the sensing element is arranged in a fixed manner on the housing, whereas the movable sensor is connected to the locking mechanism and follows the movements thereof. In this context, there is the further basic possibility that the movable sensing element or the sensor is connected to the pawl or to the catch or to both. In most cases, the procedure is that the movable sensing element is connected to the catch and interacts with the fixed sensor. Here, the invention is based on the knowledge that the safe assumption of the positions mentioned previously is ultimately (only) linked to the position of the catch. For this reason, the position of the catch safely and reliably provides information about the current position of the locking mechanism.

As a rule, the sensing element works without contact on the sensor. In principle, however, a tactile interaction can also be set up between the sensing element and the sensor. In addition, the design is usually such that the sensing element produces a plurality of third position-dependent signals as well as different signals to the sensor. If the sensing element is advantageously connected to the catch, the sensing element can generate a largely linear signal from the sensor in accordance with the angle of rotation of the catch and in accordance with the position of the catch in the measuring region that can be detected by the sensor. In this case, there is a largely linear dependency between the angle of rotation of the catch and the signal from the sensor, which dependency is able to correctly determine the three positions or many more positions of the catch that have already been specified.

According to a first embodiment, the sensing element generates a magnetic flux in the sensor that varies depending on the position of the locking mechanism. In this case, the sensor is designed as a Hall sensor. Such Hall sensors are often and advantageously used in connection with the measurement of postures and positions in motor vehicles because they function reliably and are relatively insensitive to dirt, moisture, etc. As is generally known, the functioning of the Hall sensor is designed in such a way that, overall, the Hall effect is used to measure magnetic fields.

In fact, the Hall sensors are typically current-carrying semiconductor elements in which a magnetic field running perpendicular thereto generates an output voltage that is proportional to the magnetic flux density. The sensing element now generates a varying magnetic flux in the sensor or Hall sensor in question in accordance with the movement of a locking mechanism component scanned by means of the sensing element. This will be explained in more detail in the context of the exemplary embodiment.

The sensing element is particularly preferably designed as a magnet (permanent magnet or electromagnet) and magnetized in such a way that during the movement thereof within the sensor range of the sensor, the north pole first reaches the sensor range and, near the end of the movement, the south pole reaches the sensor range, or vice versa. The north pole and south pole are interchangeable. In this way, it can be achieved that an initially weak magnetic field becomes stronger by means of the rotary movement, so that position detection is possible in this way. The magnet (permanent magnet or electromagnet) is accordingly designed in the geometric configuration thereof in such a way that a first region, in particular a beginning, forms the north pole and a second region of the magnet, in particular an end of the magnet, forms the south pole. For example, the south pole can generate a strong magnetic field, whereas the north pole generates a weaker magnetic field in comparison. The position of the magnet and thus of the sensing element can then be derived from the strength of the magnetic field. This means of recognition allows for a simple and inexpensive design through a corresponding magnetization of the magnet.

Alternatively or additionally, the sensing element can also generate a changing electrical resistance in the sensor. In this case, the sensing element is, for example, a slider in a linear potentiometer or a rotatable adjusting ring in a rotary potentiometer. Such sensors for detecting pivot angles are also conceivable elsewhere in motor vehicles and are used, for example, to detect a pivot angle of a motor vehicle door, as described in detail in DE 10 2011 119 579 A1 of the applicant. The sensor is therefore designed as a resistance sensor. In this case, depending on the position of the catch, a largely linear signal of the sensor is, in the example, generated in accordance with the angle of rotation of the catch, in the present case a correspondingly changing electrical resistance.

Finally, there is the additional or alternative possibility that the sensing element generates a different optical light intensity in the sensor. In this case, the sensor is designed as an optoelectronic sensor. For example, in the simplest case, the sensing element may be a surface or line having a changing degree of reflection for light incident thereon, emitted by the sensor and received by an associated receiver. That is, depending on the angle of rotation of the catch in the example, the sensing element attached to the catch having a changing degree of reflection ensures that the light intensity received by the optoelectronic sensor after reflection on the sensing element is changed. In this case, too, it is again conceivable that the sensing element generates a largely linear signal in accordance with the angle of rotation of the catch in accordance with the position of the catch in the measuring region of the sensor or optoelectronic sensor. It is possible to work with light in the visible range as well as, for example, in the near infrared range.

In all of these cases, the sensing element is generally arcuate. In addition, it has proven advantageous in this context if the arcuate shape of the sensing element is adapted to a pivoting movement of the locking mechanism component to be scanned. Because the sensing element is generally connected to the catch or represents or can represent a component of the catch, the arcuate shape is usually equipped with an associated radius, which is measured according to the distance to the axis of rotation of the catch. As a result, the arcuate shape of the sensing element is adapted to the pivoting movement of the locking mechanism component to be scanned, in this case the catch.

The sensor is usually connected to a control unit. The control unit can evaluate the signals from the sensor, for example to control an alarm system and/or safety devices. That is, only the perfect detection of the main ratchet position or the main closed position may correspond to the fact that the control unit activates the alarm system. The same can apply to the safety device, for example side airbags, as already described in the introduction.

According to a particularly advantageous design, the control unit evaluates signals from the sensor to control an anti-jamming protection. In this case, for example, the intermediate position between the pre-ratchet position and the main ratchet position may be detected. The intermediate position corresponds to the fact that a gap between a motor vehicle door, motor vehicle flap or motor vehicle hood associated with the motor vehicle lock is so small that jamming can no longer take place. In other words, in this case the intermediate position or the sequence of the signal for the intermediate position and then the main ratchet position can be used to switch off the otherwise active anti-jamming protection. In this way, situations can also be managed in which the motor vehicle door is only briefly and incompletely pushed shut and not closed. In this case, the sensor reports that the intermediate position has been reached, but not that the main ratchet position has been assumed immediately thereafter.

In any case, it becomes clear that the motor vehicle lock according to the invention perfectly covers all conceivable closing scenarios, sham locks, etc., with a structurally simple and functionally reliable structure. This is because, for this purpose, only a single sensing element and an associated single sensor are used. At the same time, in particular the position of the catch, as a relevant locking mechanism component, can be recorded precisely and without any doubt. This is because the sensing element predominantly generates a largely linear signal in the measuring region of the sensor in accordance with the position of the catch, which signal depends on the angle of rotation of the catch. This will be explained in more detail with reference to the description of the figures. Herein lie the essential advantages.

BRIEF DESCRIPTION OF DRAWINGS

The invention is explained in greater detail below with reference to an exemplary embodiment in the drawings. In the drawings.

DETAILED DESCRIPTION

Figure 1A:
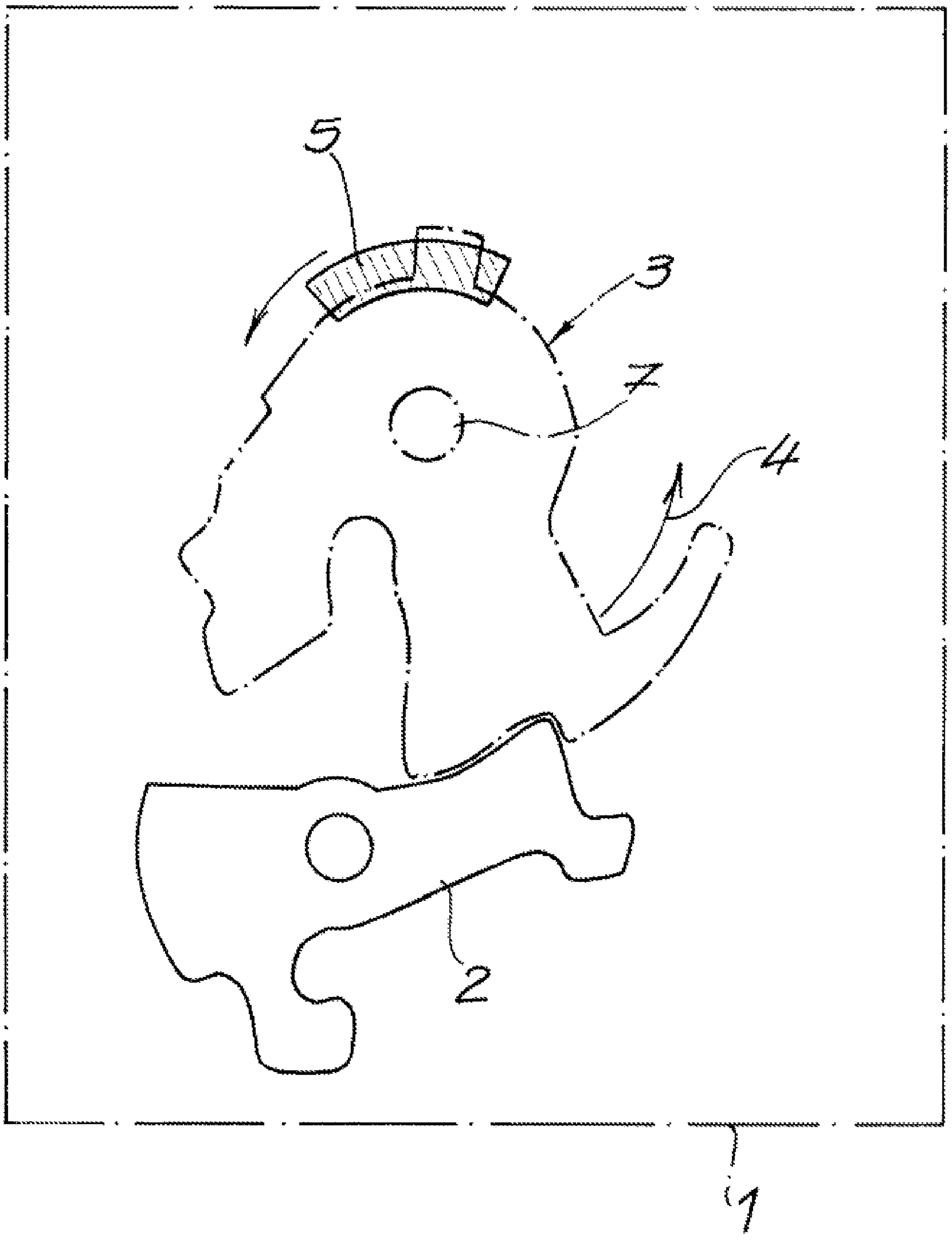
FIG. 1A shows the motor vehicle lock according to the invention reduced to the components essential for the invention, with the locking mechanism thereof in the pre-ratchet position.

In the figures, a motor vehicle lock is shown, which is shown only with the components thereof essential for the invention. Firstly, a latch case 1 in which a locking mechanism 2, 3 is mounted can be seen. The locking mechanism 2, 3 is composed, as usual, of a pawl 2 and a catch 3, which are each rotatably mounted in the latch case 1 taking into account spaced axes of rotation, and which interact with one another in a known manner. In addition, a closing drive 4 may be provided, which, during the transition from the pre-ratchet position according to FIG. 1A, finally transfers the catch 3 to the main ratchet position according to FIG. 10 via the intermediate position in FIG. 1B by pivoting the catch 3 in the indicated counterclockwise direction about the axis of rotation thereof.

Figure 2:
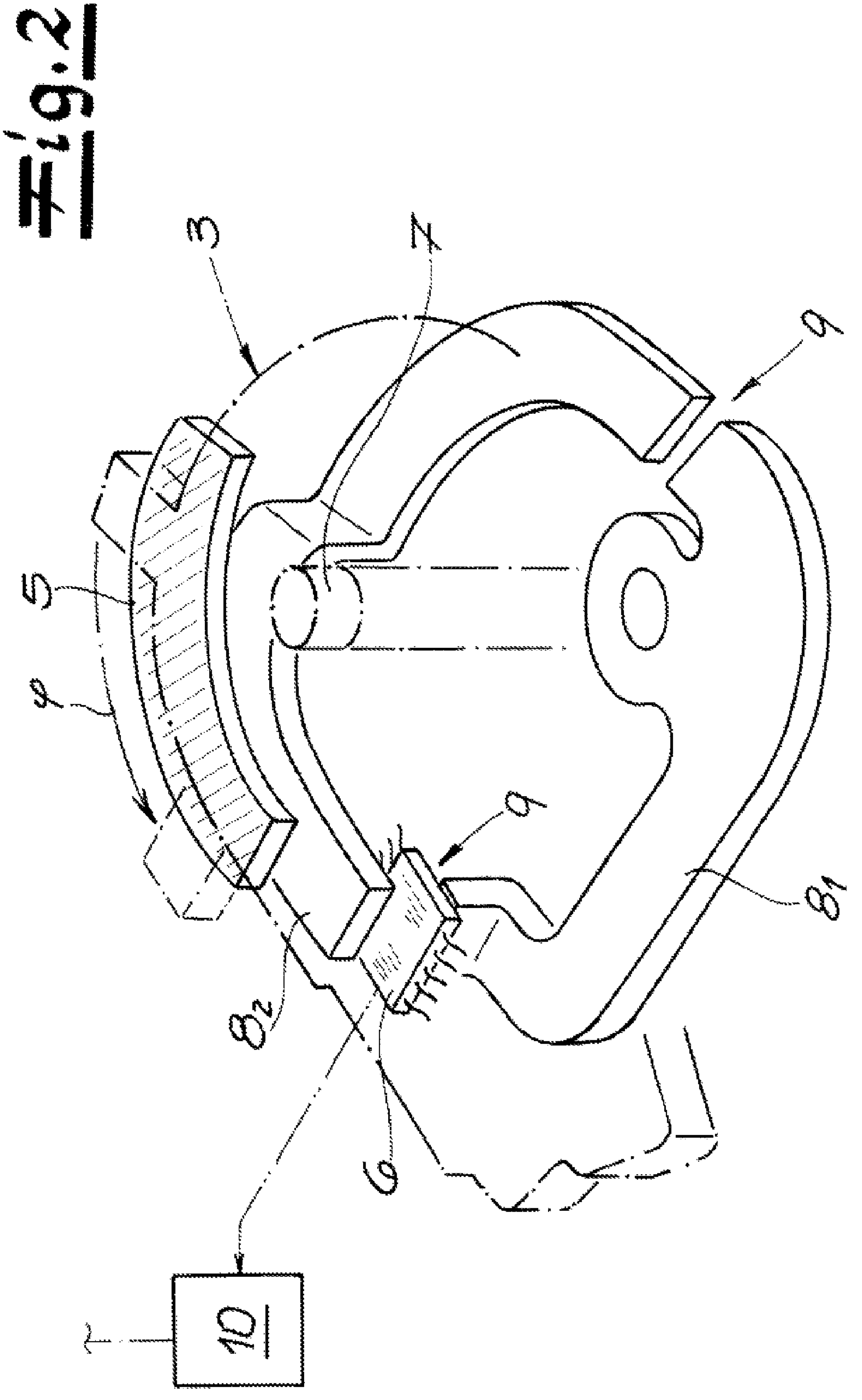

In addition, a sensor arrangement 5, 6 assigned to the locking mechanism 2, 3 is realized, the detailed structure of which can best be seen in FIG. 2. The sensor arrangement 5, 6 is composed of a fixed sensor 6 and a sensing element 5 that influences the signals from the sensor 6 and follows the locking mechanism 2, 3.

Figure 3:
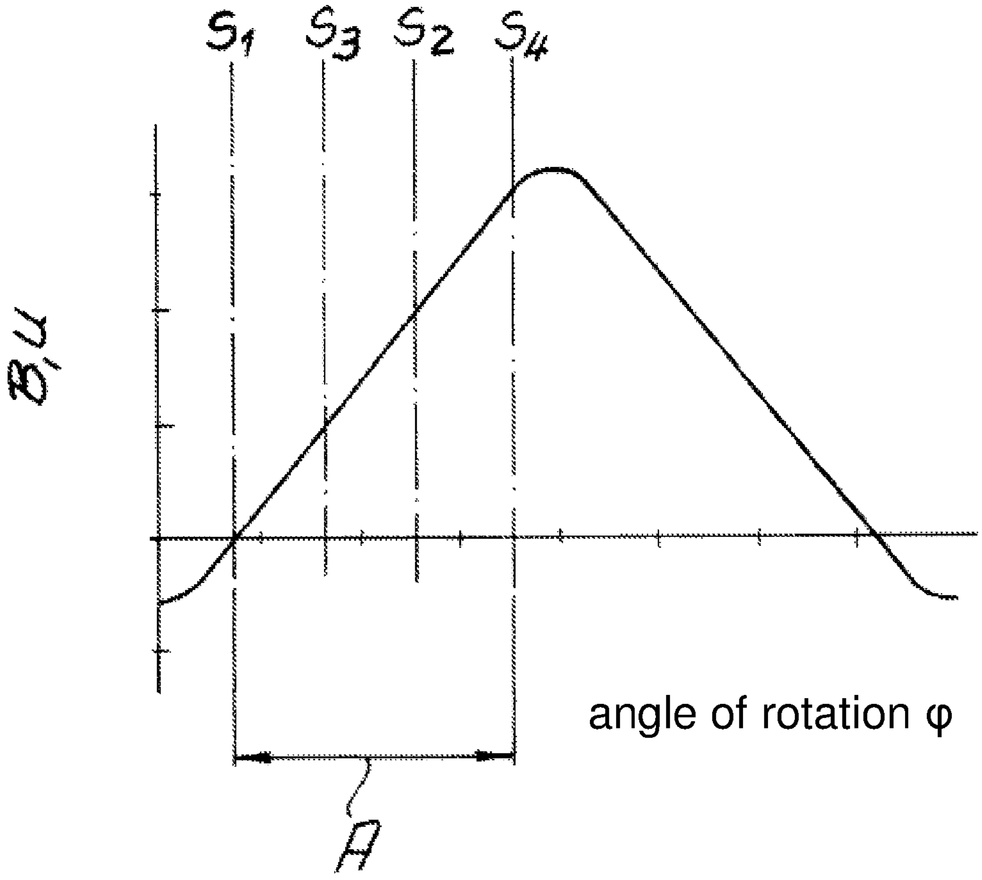
FIG. 3 is a schematic characteristic curve of the sensor arrangement according to FIG. 2.

In the context of the exemplary embodiment, a single sensing element 5 is provided, which is designed to be movable and follows the movements of the locking mechanism 2, 3, in the present case connected to the catch 3. In contrast, the sensor 6 is designed to be fixed and attached in or on the latch case 1. The sensor 6 generates at least two different signals $S_1$, $S_2$ associated with the presence and absence of the sensing element 5 in the region of influence of the sensor 6. According to the invention, the single sensing element 5 additionally produces at least one further third signal $S_3$ from the single sensor 6 in accordance with the position thereof relative to the sensor 6. According to the exemplary embodiment and as shown in FIG. 3, a further third signal or a fourth signal $S_4$ is additionally generated with the aid of the sensing element 5 when the locking mechanism 2, 3 assumes a certain position in the sensor 6. All of the signals $S_1$, $S_2$, $S_3$, $S_4$ lie within a measuring region or working region A of the sensor 6.

Figure 1B:
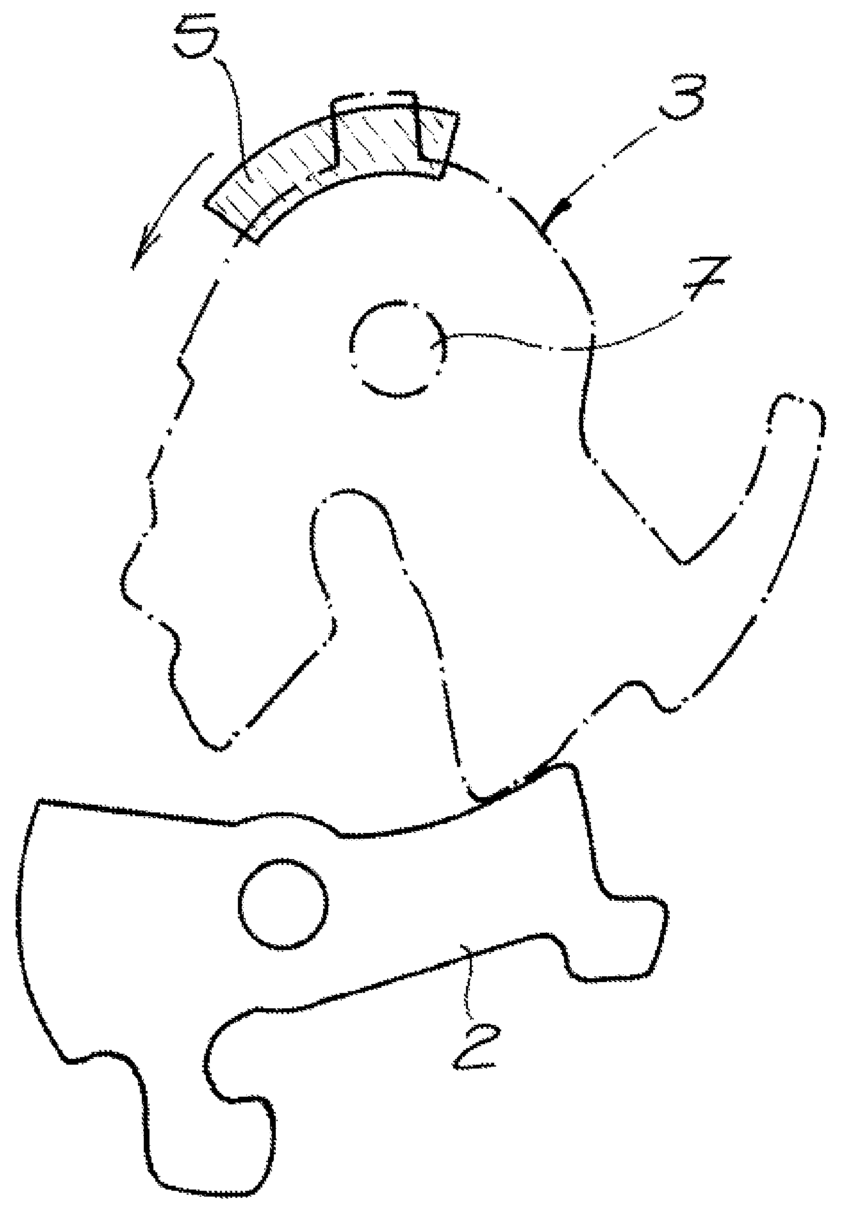
FIG. 1B shows an intermediate position between the pre-ratchet position and the main ratchet position.
Figure 1C:
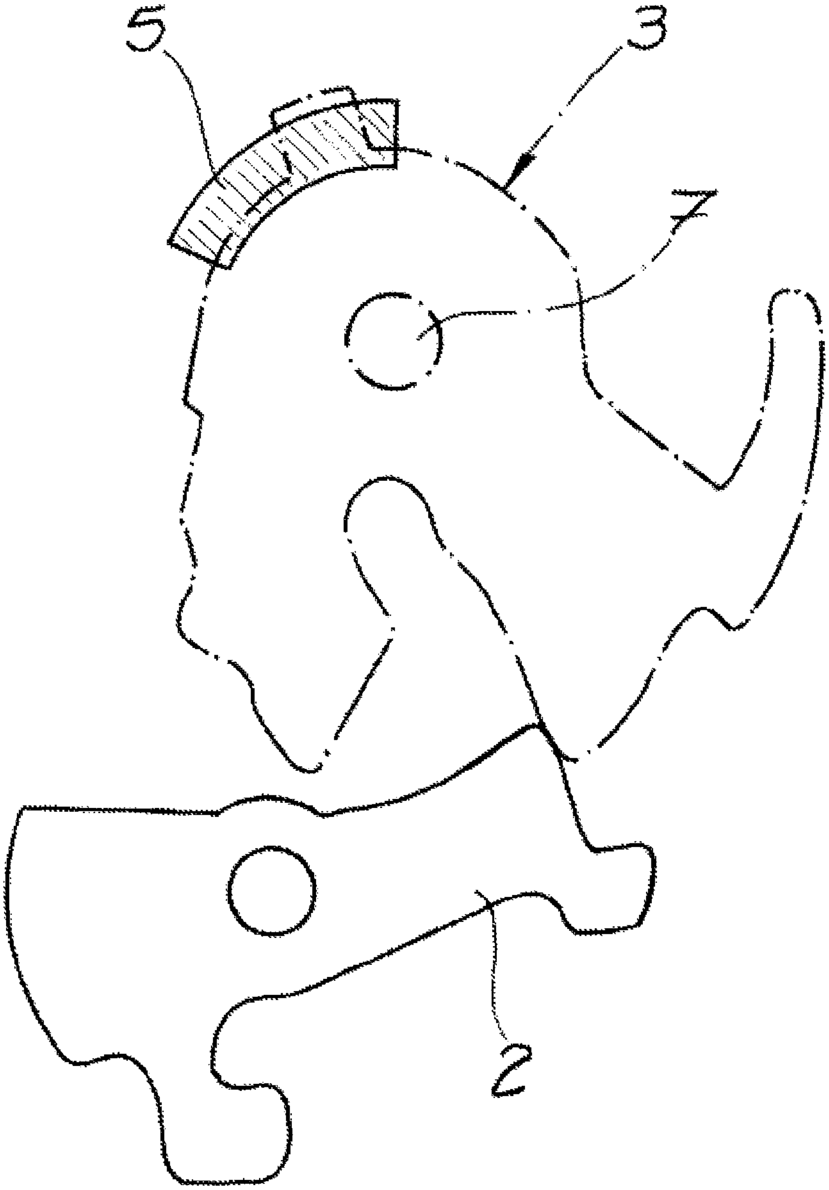
FIG. 1C shows the motor vehicle lock or its locking mechanism in the main ratchet position and FIG. 2 shows the sensing element used, including the sensor, in a schematic perspective illustration

The signal $S_1$ is associated with the pre-ratchet position according to FIG. 1A. The intermediate position according to FIG. 1B is represented by the signal $S_3$. The signal $S_2$ is the signal of the sensor 6 associated with the main ratchet position according to FIG. 10. The fourth signal $S_4$ finally corresponds to an over-travel position (not shown) of the locking mechanism 2, 3, which occurs when the closing drive 4 acts on the catch, rotating counterclockwise about the axis of rotation thereof beyond the main ratchet position shown in FIG. 10.

As already explained, the movable sensing element 5 is connected to the locking mechanism 2, 3, in the present case to the catch 3. In addition, the sensing element 5 works without contact on the fixed sensor 6. According to the exemplary embodiment, the sensing element 5 generates a varying magnetic flux in the sensor 6. For this purpose, the sensor 6 in the exemplary embodiment is designed as a Hall sensor 6, as can best be seen from the illustration in FIG. 2.

The sensing element 5 has an arcuate design, as FIG. 2 clearly shows. The arcuate shape of the sensing element 5 is adapted to the pivoting movement of the catch 3 to be scanned. That is, according to the exemplary embodiment, the arcuate sensing element 5 and the catch 3 have the same radius as compared to a common axis of rotation 7 that can be seen in FIG. 2.

Rotations of the catch 3 and thus of the arcuate sensing element 5 connected thereto by an angle $\varphi$ shown in FIG. 2 with respect to the common axis of rotation 7 now, in the case of the sensor or Hall sensor 6, cause the sensor 6 to generate a signal that is largely linear depending on the angle of rotation $\varphi$, which signal corresponds to a corresponding flux density B of the magnetic field lines in accordance with the diagram in FIG. 3. Because in the case of a Hall sensor 6 the flux density B, which changes in accordance with the angle of rotation φ of the catch 3 and consequently of the sensing element 5, influences the proportional output voltage U generated at the sensor 6 in the same way and linearly, the different signals $S_1$ to $S_4$ can be distinguished from each other perfectly.

This is made clear by FIG. 3, which shows the linear dependence of the flux density B or the output voltage U at the sensor 6 on the angle φ of the catch 3.

The overall design is such that the sensing element 5 causes a corresponding change in the magnetic flux only in the region of influence of the sensor or Hall sensor 6. The region of influence of the sensor or Hall sensor 6 is indicated in FIG. 3 as the working region A and extends from the signal $S_1$ to the signal $S_4$. It can be seen that in the working region A in question, the sensing element 5 generates a largely linear signal in the Hall sensor 6 in accordance with the angle of rotation φ of the catch 3.

In order to achieve this in detail and in accordance with the illustration in FIG. 2, the sensing element 5 is an arcuate permanent magnet. The magnetic flux of this arcuate permanent magnet or sensing element 5 is fed back via a so-called flux guide or two flux guides $\mathbf{8}_1$ and $\mathbf{8}_2$ having associated air gaps 9 as part of the latch case 1 and the likewise ferromagnetic axis of rotation 7. Depending on the angular position of the arcuate permanent magnet or sensing element 5 and, consequently, the catch 3, i.e. depending on the angle φ of the catch 3, the arcuate magnet 5 is guided via the two flux guide pieces $\mathbf{8}_1$ and $\mathbf{8}_2$, in the magnetic path of which the Hall sensor 6 is embedded in an air gap 9. In this way, the linear dependency shown schematically in FIG. 3 between the magnetic flux density B generated and varying in the Hall sensor 6 and, consequently, the output-side voltage U at the Hall sensor 6 is generated in accordance with the angle or angle of rotation φ of the catch 3 with respect to the axis of rotation 7 thereof.

The sensor or Hall sensor 6 is in turn connected to a control unit 10. The control unit 10 can evaluate the signals from the sensor 6, for example, to control an anti-jamming protection and/or an alarm system and/or safety devices, as already described in the introduction.

LIST OF REFERENCE SIGNS

1 latch case
2 pawl
2, 3 locking mechanism
3 catch
4 closing drive
5 sensing element
5, 6 sensor arrangement
6 sensor/Hall sensor
7 axis of rotation
$\mathbf{8}_1$, $\mathbf{8}_2$ flux guide pieces
10 control unit
A working region
B flux density
$S_1$, $S_2$, $S_3$, $S_4$ signals
U output voltage
φ angle/angle of rotation

The invention claimed is:

1. A motor vehicle lock comprising:

a locking mechanism having a catch and a pawl;

a sensor arrangement associated with the locking mechanism, the sensor arrangement including a fixed sensor and a movable sensing element that influences signals of the fixed sensor and follows rotation of the catch, the fixed sensor generating at least two different signals associated with presence and absence of the movable sensing element in a region of influence of the fixed sensor, wherein the movable sensing element produces at least one additional third signal of the fixed sensor in accordance with a position of the fixed sensor in relation to the movable sensing element, wherein rotation of the movable sensing element caused by rotation of the catch causes the sensor to generate a continuous linear increasing signal corresponding to a linearly increasing output voltage at the sensor or continuous linear decreasing signal corresponding to a linearly decreasing output voltage at the sensor in accordance with an angle of rotation of the catch in accordance with a position of the movable sensing element in a measuring region of the fixed sensor; and flux guide pieces for the movable sensing element, wherein the motor vehicle lock includes two flux guide pieces having associated air gaps between the two flux guide pieces, wherein the fixed sensor is arranged in an air gap of the associated air gaps.

2. The motor vehicle lock according to claim 1, wherein the movable sensing element is connected to the locking mechanism and the fixed sensor is fixed on a housing.

3. The motor vehicle lock according to claim 1, wherein the movable sensing element acts without contact on the fixed sensor.

4. The motor vehicle lock according to claim 1, wherein the at least one additional third signal includes a plurality of third, position-dependent and different signals.

5. The motor vehicle lock according to claim 1, wherein the movable sensing element generates a varying magnetic flux and/or a changing electrical resistance and/or a different optical light intensity in the fixed sensor.

6. The motor vehicle lock according to claim 5, wherein the fixed sensor is a Hall sensor and/or a resistance sensor and/or an optoelectronic sensor.

7. The motor vehicle lock according to claim 1, wherein the movable sensing element is arched.

8. The motor vehicle lock according to claim 7, wherein the arched shape of the movable sensing element is adapted to a pivoting movement of a locking mechanism component of the locking mechanism to be sensed.

9. The motor vehicle lock according to claim 1, wherein the fixed sensor is connected to a control unit that evaluates the signals of the fixed sensor to control an anti-jamming protection and/or an alarm system and/or safety devices.

10. The motor vehicle lock according to claim 5, wherein the movable sensing element is formed as a magnet and magnetized so that during a movement thereof within a sensor range of the fixed sensor, first a north pole of the magnet reaches the sensor range and, near an end of the movement, a south pole of the magnet reaches the sensor range.

11. The motor vehicle lock according to claim 1, wherein the locking mechanism has a pre-ratchet position, an intermediate position, a main ratchet position, and an over-travel position.

12. The motor vehicle lock according to claim 1, wherein the movable sensing element generates a magnetic flux in the fixed sensor which is a Hall sensor.

13. The motor vehicle lock according to claim 1, wherein a catch axis of rotation is spaced from a pawl axis of rotation, and wherein the movable sensing element is arranged on the catch.

14. The motor vehicle lock according to claim 1, wherein the movable sensing element is arcuate, the movable sensing element and the catch having a same radius relative to a common axis of rotation.

15. The motor vehicle lock according to claim 1, wherein the movable sensing element is a permanent magnet or electromagnet.

16. A motor vehicle lock comprising:

a locking mechanism having a catch and a pawl;

a sensor arrangement associated with the locking mechanism, the sensor arrangement including a fixed sensor and a movable sensing element that influences signals of the fixed sensor and follows rotation of the catch, the fixed sensor generating at least two different signals associated with presence and absence of the movable sensing element in a region of influence of the fixed sensor, wherein the movable sensing element produces at least one additional third signal of the fixed sensor in accordance with a position of the fixed sensor in relation to the movable sensing element, wherein rotation of the movable sensing element caused by rotation of the catch causes the sensing element to generate a linear increasing signal or linear decreasing signal in accordance with an angle of rotation of the catch in accordance with a position of the movable sensing element in a measuring region of the fixed sensor; and flux guide pieces for the movable sensing element, wherein the motor vehicle lock includes two flux guide pieces having associated air gaps between the two flux guide pieces, wherein the fixed sensor is arranged in an air gap of the associated air gaps.

* * * * *